US00RE51095E

(19) United States
(12) Reissued Patent
Fujii et al.

(10) Patent Number: US RE51,095 E
(45) Date of Reissued Patent: Oct. 27, 2026

(54) DISPLAY DEVICE AND DRIVING METHOD THEREOF

(71) Applicant: SAMSUNG DISPLAY CO., LTD., Yongin-si (KR)

(72) Inventors: Mitsuru Fujii, Yongin-si (KR); Ji Ye Moon, Yongin-si (KR); Ju Gon Seok, Yongin-si (KR); Hoo Hyeon Lee, Yongin-si (KR)

(73) Assignee: Samsung Display Co., Ltd., Yongin-si (KR)

(21) Appl. No.: 18/523,787

(22) Filed: Nov. 29, 2023

Related U.S. Patent Documents

Reissue of:
(64) Patent No.: 11,189,218
Issued: Nov. 30, 2021
Appl. No.: 17/021,303
Filed: Sep. 15, 2020

(30) Foreign Application Priority Data

Feb. 28, 2020 (KR) ..... 10-2020-0024898

(51) Int. Cl.
*G09G 3/32* (2016.01)

(52) U.S. Cl.
CPC ..... *G09G 3/32* (2013.01); *G09G 2310/027* (2013.01); *G09G 2320/0209* (2013.01); *G09G 2330/028* (2013.01); *G09G 2360/16* (2013.01)

(58) Field of Classification Search
CPC ... G09G 2320/0209; G09G 2320/0233; G09G 3/3233; G09G 3/32; G09G 2360/16; G09G 2330/028; G09G 2310/027
See application file for complete search history.

(56) References Cited

U.S. PATENT DOCUMENTS 8,922,602 B2 12/2014 Choi et al.
9,959,812 B2 5/2018 Hwang et al.
10,380,947 B2 8/2019 Fujii et al.
(Continued)

FOREIGN PATENT DOCUMENTS

CN 1534571 10/2004
CN 108269525 A 7/2018
(Continued)

OTHER PUBLICATIONS

Notice of Allowance issued in Korean Patent Application No. 10-2020-0024898 on Feb. 10, 2025.
(Continued)

*Primary Examiner* — Dennis G Bonshock
(74) *Attorney, Agent, or Firm* — F. Chau & Associates, LLC

(57) ABSTRACT

A display device and a driving method thereof are disclosed. The display device includes a display panel including a plurality of pixels connected to data lines; a data driver connected to the data lines and configured to determine first data voltages corresponding to the pixels, to generate second data voltages by adding a compensation voltage to the first data voltages, and to supply the second data voltages to the pixels through the data lines; and a crosstalk compensator connected to the data driver and configured to calculate the compensation voltage by comparing the first data voltages corresponding to pixels disposed in at least three adjacent horizontal lines.

28 Claims, 7 Drawing Sheets

(56) References Cited

U.S. PATENT DOCUMENTS

| | | | | |
|---|---|---|---|---|
| 2002/0097207 | A1* | 7/2002 | Pfeiffer | G09G 3/3611 345/87 |
| 2004/0239587 | A1* | 12/2004 | Murata | G09G 3/20 345/58 |
| 2012/0299895 | A1* | 11/2012 | Lin | G09G 3/3655 345/211 |
| 2015/0009188 | A1* | 1/2015 | Choi | G09G 3/20 345/204 |
| 2016/0240128 | A1* | 8/2016 | Kim | G09G 3/3291 |
| 2016/0351157 | A1* | 12/2016 | Pyun | G09G 3/3688 |
| 2017/0092209 | A1 | 3/2017 | Cao | |
| 2017/0154944 | A1* | 6/2017 | Kim | H10D 86/60 |
| 2017/0193908 | A1 | 7/2017 | Wang | |
| 2018/0330665 | A1 | 11/2018 | Fujii et al. | |
| 2021/0272508 | A1 | 9/2021 | Fujii et al. | |

FOREIGN PATENT DOCUMENTS

| | | | |
|---|---|---|---|
| CN | 108877670 | A | 11/2018 |
| JP | 3877694 | | 11/2006 |
| KR | 10-2011-0063021 | | 6/2011 |
| KR | 10-2012-0076220 | A | 7/2012 |
| KR | 10-2012-0109805 | | 10/2012 |
| KR | 10-2012-0116615 | A | 10/2012 |
| KR | 10-2014-0042623 | A | 4/2014 |
| KR | 10-2019-0050887 | A | 5/2019 |
| KR | 10-2122541 | B1 | 6/2020 |
| KR | 10-2296403 | B1 | 9/2021 |

OTHER PUBLICATIONS

Office Actionissued in Chinese Patent Application No. 202110037342.0 on Feb. 24, 2025.

Notice of Allowance dated Jul. 28, 2021 in corresponding U.S. Appl. No. 17/021,303.

Office Action dated Apr. 9, 2021 in corresponding U.S. Appl. No. 17/021,303.

Notice of Allowance issued in Korean Patent Application No. 10-2025-0061524 on Jan. 22, 2026.

* cited by examiner

DISPLAY DEVICE AND DRIVING METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE

This application claims priority under 35 U.S.C. § 119 to Korean Patent Application No. 10-2020-0024898 filed in the Korean Intellectual Property Office on Feb. 28, 2020, the entire contents of which are incorporated by reference.

FIELD

The present disclosure relates to a display device, and more particularly relates to a display device and a driving method thereof.

DISCUSSION OF RELATED ART

With ongoing developments in information technology, there is an increased importance emerging for a display device as a connection medium between a user and information. In response, there is increased usage of display devices, such as liquid crystal display devices, organic light emitting diode display devices, or the like.

Each pixel of each display device can emit light with luminance corresponding to a data voltage supplied through a data line. Such a display device can display an image frame by combining emissions of multiple pixels.

With multiple pixels in each row or column, a line crosstalk effect or a horizontal crosstalk effect may occur, which deteriorates display quality according to a pattern of the image frame. When the line crosstalk effect occurs, an unintended bright line or an unintended dark line is displayed, which a user may recognize as a display error.

SUMMARY

An exemplary embodiment of the present disclosure provides a display device that supplies pixels by adding to a data voltage supplied to the pixels a compensation voltage to remove a horizontal crosstalk component generated between the pixels disposed in units of horizontal lines.

Another embodiment of the present disclosure provides a driving method of the display device.

However, embodiments of the present disclosure are not limited to the exemplary embodiments described herein, but may be variously extended in ranges that do not depart from the scope or spirit of the present disclosure.

Another embodiment of the present disclosure provides a display device.

The display device includes a display panel having a plurality of pixels connected to data lines; a data driver connected to the data lines and configured to determine first data voltages corresponding to the pixels, to generate second data voltages by adding a compensation voltage to the first data voltages, and to supply the second data voltages to the pixels through the data lines; and a crosstalk compensator connected to the data driver and configured to calculate the compensation voltage by comparing the first data voltages corresponding to pixels disposed in at least three adjacent horizontal lines.

The crosstalk compensator may include a first data compensator that outputs a first compensation voltage by comparing the first data voltages corresponding to pixels disposed in a horizontal line with the first data voltages corresponding to pixels disposed in an adjacent horizontal line; and a second data compensator that outputs a second compensation voltage by comparing the first data voltages corresponding to pixels disposed in the adjacent horizontal line to the first data voltages corresponding to pixels disposed in at least one next adjacent horizontal line.

The crosstalk compensator may further include a first adder that calculates the compensation voltage by linearly combining the first compensation voltage and the second compensation voltage.

The first data compensator may include an average voltage calculator that outputs a first average value of the first data voltages corresponding to the pixels disposed in the horizontal line; a first delay unit that outputs a second average value of the first data voltages corresponding to the pixels disposed in the adjacent horizontal line such as by delaying an output of the average voltage calculator by a predetermined time; a difference calculator that outputs a first difference voltage by differentiating from each other the first average value and the second average value; and a first compensation gain application unit that outputs the first compensation voltage by applying a first compensation gain to the first difference voltage.

The first compensation gain may be predetermined to cancel a horizontal crosstalk component between the pixels disposed in the horizontal line and the pixels disposed in the adjacent horizontal line.

The predetermined time may be 1 horizontal period.

The second data compensator may include a second delay unit that outputs at least one difference voltage corresponding to the pixels disposed in the adjacent horizontal line to the at least one next adjacent horizontal line by delaying an output of the difference calculator by a predetermined time; a second compensation gain application unit that applies an independent second compensation gain to the at least one difference voltage; and a second adder that outputs the second compensation voltage by adding output values of the second compensation gain application unit.

The second compensation gain may be predetermined to cancel a horizontal crosstalk component between the pixels disposed in the adjacent horizontal line to the at least one next adjacent horizontal line.

The at least one difference voltage may include a second difference voltage between an average value of the first data voltages corresponding to the pixels disposed in the adjacent horizontal line and an average value of the first data voltages corresponding to the pixels disposed in the next adjacent horizontal line; and a third difference voltage between the average value of the first data voltages corresponding to the pixels disposed in the next adjacent horizontal line and an average value of the first data voltages corresponding to pixels disposed in a next farther adjacent horizontal line.

The second data compensator may include a second adder that adds the first difference voltage and an output of a second compensation gain application unit to each other and outputs an added value; a second delay unit that outputs the second compensation voltage by delaying an output of the second adder by a predetermined time; and a second compensation gain application unit that outputs feedback to the second adder by applying second compensation gain to the output of the second delay unit.

The display device may further include a memory that stores the first data voltages in units of one horizontal line.

The data driver may read the first data voltages corresponding to the pixels disposed in the horizontal line from the memory, and generate the second data voltages by adding the compensation voltage to each of the read first data voltages.

Another embodiment of the present disclosure provides a driving method of a display device.

A driving method of a display device includes determining first data voltages to corresponding to data lines connected to pixels based on image data; calculating a compensation voltage for compensating for a horizontal crosstalk component by comparing the first data voltages corresponding to pixels disposed in at least three adjacent horizontal lines; generating second data voltages by adding the compensation voltage to the first data voltages; and supplying the second data voltages to the data lines.

The calculating the compensation voltage may include calculating a first compensation voltage by comparing the first data voltages corresponding to pixels disposed in a horizontal line with the first data voltages corresponding to pixels disposed in an adjacent horizontal line; and calculating a second compensation voltage by comparing the first data voltages corresponding to pixels disposed in the adjacent horizontal line to at least one next adjacent horizontal line in units of one horizontal line.

The calculating the compensation voltage may further include calculating the compensation voltage by linearly combining the first compensation voltage and the second compensation voltage.

The calculating the first compensation voltage may include calculating a first difference voltage by differentiating from each other a first average value of the first data voltages corresponding to the pixels disposed in the horizontal line and a second average value of the first data voltages corresponding to the pixels disposed in the adjacent horizontal line; and calculating the first compensation voltage by applying a first compensation gain to the first difference voltage.

The first compensation gain may be predetermined to cancel a horizontal crosstalk component between the pixels disposed in the horizontal line and the pixels disposed in the adjacent horizontal line.

The calculating the second compensation voltage may include calculating average values in units of one horizontal line for the first data voltages corresponding to pixels disposed in the adjacent horizontal line to the at least one next adjacent horizontal line; calculating at least one difference voltage by differentiating from each other average values corresponding to adjacent horizontal lines among the average values; applying a second compensation gain to the at least one difference voltage; and calculating the second compensation voltage by adding the at least one difference voltage to which the second compensation gain is applied.

The second compensation gain may be independently applied to the at least one difference voltage at a constant attenuation ratio.

In the generating the second data voltages, the second data voltage may be generated by adding the compensation voltage to each of the first data voltages corresponding to the pixels disposed in the horizontal line.

A display device and a driving method thereof according to an exemplary embodiment of the present disclosure may prevent a horizontal crosstalk component or line crosstalk component capable of being generated over three or more horizontal lines as well as over two adjacent horizontal lines.

DETAILED DESCRIPTION

Figure 1:
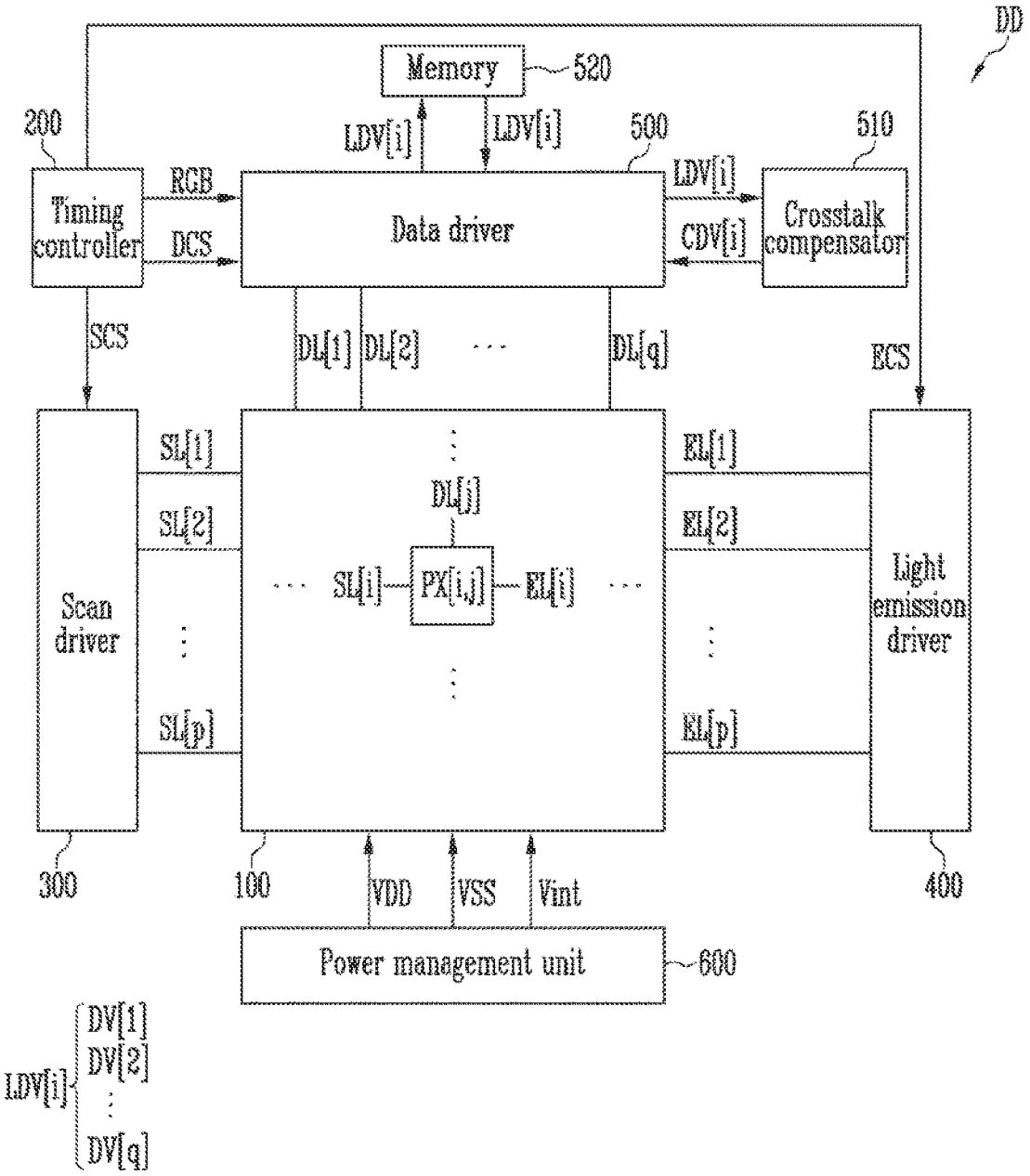
FIG. 1 is a schematic block diagram illustrating a display device according to an exemplary embodiment of the present disclosure.

Hereinafter, with reference to accompanying drawings, various exemplary embodiments of the present disclosure will be described in detail so that those skilled in the art may easily implement these and other embodiments of the present disclosure. The present disclosure may be embodied in many different forms and is not limited to the exemplary embodiments described herein.

In order to clearly illustrate the present disclosure, parts that are not related to the description may be omitted, and the same or similar constituent elements may be given the same reference numerals throughout the specification. Therefore, the above-mentioned reference numerals may be used in other drawings.

In addition, since the sizes and thicknesses of each configuration shown in the drawings are arbitrarily shown for better understanding and ease of description, the scope of the present disclosure is not necessarily limited to the illustrated configurations. In the drawings, the dimensions of layers and regions may be exaggerated for clarity of illustration.

FIG. 1 illustrates a display device according to an exemplary embodiment of the present disclosure.

Referring to FIG. 1, a display device DD may include a display panel 100, a timing controller 200, a scan driver 300, a light emission driver 400, a data driver 500, a crosstalk compensator 510, a memory 520, and a power management unit 600.

The display panel 100 may include a plurality of pixels PX[i, j]. The plurality of pixels PX[i, j] may consist of p rows and q columns, where p and q are natural numbers. The pixels PX[i, j] disposed in the same row, which may be referred to as a horizontal line, may be connected to the same scan line and the same light emission line. In addition, the pixels PX[i, j] disposed in the same column, which may be referred to as a vertical line, may be connected to the same data line. For example, the pixel PX[i, j] disposed in the i-th row, where i is natural number less than p, and the j-th column, where j is natural number less than q, [may be connected to the i-th scan line SL[i] and the i-th light emission line EL[i], and may be connected to the j-th data line DL[j].

The timing controller 200 can generate a scan driving control signal SCS, a data driving control signal DCS, and a light emission control signal ECS in response to synchronous signals supplied from the external. The scan driving control signal SCS may be supplied to the scan driver 300, the data driving control signal DCS may be supplied to the data driver 500, and the light emission control signal ECS may be supplied to the light emission driver 400. In addition, the timing controller 200 may generate image data RGB based on input image data supplied from an external source, and supply the generated image data RGB to the data driver 500. For example, the timing controller 200 may determine digital voltages corresponding to grayscale values constituting input image data, and generate image data RGB indicating the determined digital voltages.

The scan driving control signal SCS may include a scan start signal and clock signals. The scan start signal may be a signal for controlling a first timing of a scan signal. The clock signals may be used to shift the scan start signal.

The light emission control signal ECS may include a light emission start signal and clock signals. The light emission start signal may control a first timing of a light emission signal. The clock signals may be used to shift the light emission start signal.

The data driving control signal DCS may include source start pulse and clock signals. The source start pulse may control a sampling start point of data. The clock signals may be used to control a sampling operation.

The scan driver 300 may receive the scan driving control signal SCS from the timing controller 200, and sequentially supply the scan signal to the scan lines SL[1], SL[2], . . . , SL[p] based on the scan driving control signal SCS. When the scan signal is sequentially supplied, the pixels PX[i, j] may be selected in units of horizontal line, or in units of pixel line, and a data signal may be supplied to the selected pixels PX[i, j].

The scan driver 300 may include scan stages configured in the form of shift registers. The scan driver 300 can generate the scan signal by sequentially transferring to the next scan stage the scan start signal having a pulse form at a turn-on level under the control of the clock signal.

The light emission driver 400 may receive the light emission control signal ECS from the timing controller 200, and sequentially supply the light emission signal to the light emission control lines EL[1], EL[2], . . . , EL[p] based on the light emission control signal ECS. The light emission signal may be used to control the light emission time of pixels PX[i, j]. For this purpose, the light emission signal may be set to a wider width than the scan signal.

The data driver 500 may receive the data driving control signal DCS and the image data RGB from the timing controller 200. The data driver 500 may determine first data voltages to be supplied to data lines DL[1], DL[2], . . . , DL[q] based on the image data RGB, and supply second data voltages to the data lines DL[1], DL[2], . . . , DL[q], the second data voltages being generated by adding a compensation voltage to the determined first data voltages for compensating for a horizontal crosstalk component.

The data driver 500 may supply the second data voltages to the data lines DL[1], DL[2], . . . , DL[q] in response to the data driving control signal DCS. The second data voltages may be supplied to the pixels PX[i, j] disposed on the horizontal line selected by the scan signal. For this purpose, the data driver 500 may supply the second data voltages to the data lines DL[1], DL[2], . . . , DL[q] in synchronization with the scan signal.

For example, the data driver 500 may determine first data voltages DV[1], DV[2], . . . , DV[q], hereinafter referred to as LDV[i], to be supplied to the pixels PX[i, j] disposed on the i-th horizontal line selected by the scan signal, and store the determined first data voltages LDV[i] in the memory 520 in units of horizontal lines or per 1 horizontal period.

In addition, the data driver 500 may transfer first data voltages DV[1], DV[2], . . . , DV[q], hereinafter referred to as LDV[i], to be supplied to the pixels PX[i, j] disposed on the i-th horizontal line to the crosstalk compensator 510, and receive a compensation voltage CDV[i] for compensating the first data voltages DV[1], DV[2], . . . , DV[q] from the crosstalk compensator 510. The data driver 500 may generate second data voltages by adding the received compensation voltage CDV[i] to each of the first data voltages DV[1], DV[2], . . . , DV[q] read from the memory 520.

The crosstalk compensator 510 may calculate the compensation voltage CDV[i], by comparing the first data voltages, such as LDV[i−2], LDV[i−1], LDV[i], corresponding to pixels disposed on three or more horizontal lines, such as i−2-th, i−1-th, and i-th horizontal lines, that are adjacent to each other among the pixels PX[i, j] in units of adjacent horizontal lines, and transfer the calculated compensation voltage CDV[i] to the data driver 500. Specifically, for example, the crosstalk compensator 510 may compare the first data voltages LDV[i] corresponding to pixels disposed on an i-th horizontal line with the first data voltages LDV[i−1] corresponding to pixels disposed on an i−1-th horizontal line. The crosstalk compensator 510 may compare the first data voltages LDV[i−1] corresponding to pixels disposed on an i−1-th horizontal line with the first data voltages LDV[i−2] corresponding to pixels disposed on an i−2-th horizontal line. The crosstalk compensator 510 may compare the first data voltages LDV[i−2] corresponding to pixels disposed on an i−2-th horizontal line with the first data voltages LDV[i−3] corresponding to pixels disposed on an i−3-th horizontal line. Here, the calculated compensation voltage LDV[i] may be added to the first data voltages LDV[i] corresponding to pixels disposed on the i-th horizontal line.

That is, the crosstalk compensator 510 according to an exemplary embodiment of the present disclosure may additionally consider the first data voltages LDV[i−2] and LDV[i−3] corresponding to the pixels disposed on the i−2-th horizontal line and the i−3-th horizontal line as well as the first data voltages LDV[i−1] corresponding to the pixels disposed on the i−1-th horizontal lines to compensate the first data voltages LDV[i] corresponding to the pixels disposed on the i-th horizontal line, thereby removing the horizontal crosstalk being generated over two or more horizontal lines.

The power management unit 600 may supply the voltage of the first power supply VDD, the voltage of the second power supply VSS, and the voltage of the initialization power supply Vint to the display panel 100. The first power supply VDD and the second power supply VSS may generate voltages for driving a light emitting element included in each pixel PX[i, j] of the display panel 100. In an exemplary embodiment, the voltage of the second power supply VSS may be lower than the voltage of the first power supply VDD. For example, the voltage of the first power supply VDD may be a positive voltage, and the voltage of the second power supply VSS may be a negative voltage. The driving transistor and/or light emitting element included in the pixel PX[i, j] may be initialized by the voltage of the initialization power supply Vint.

In FIG. 1, the crosstalk compensator 510 and the memory 520 are shown separately from the data driver 500, but embodiments are not limited thereto, and the crosstalk compensator 510 and the memory 520 may be implemented integrally with the data driver 500.

Figure 2:
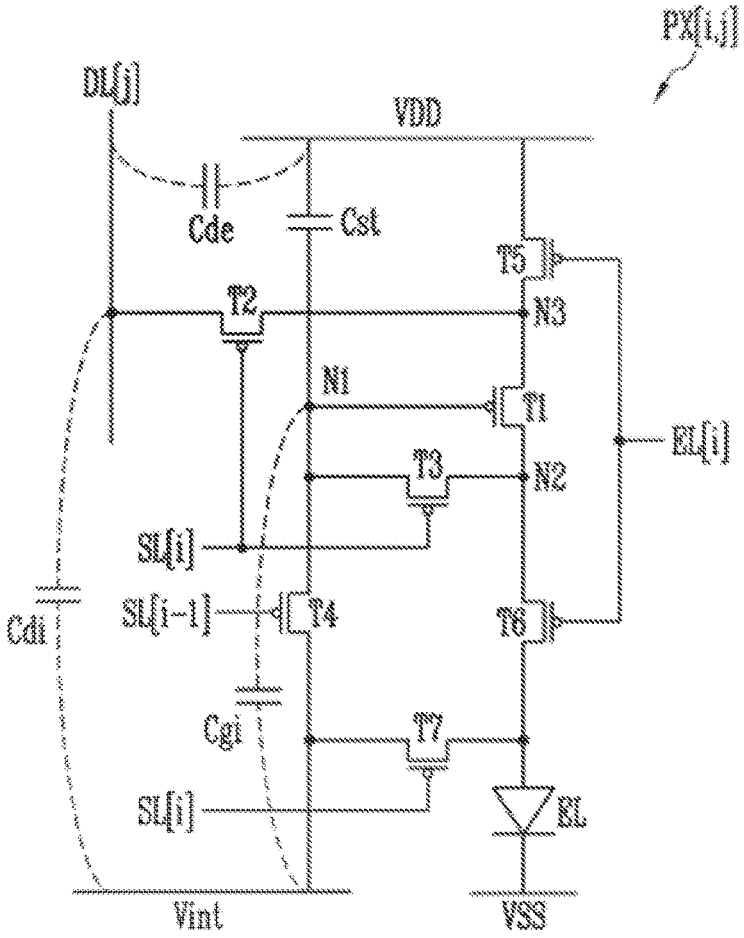
FIG. 2 is a schematic circuit diagram illustrating a pixel according to an exemplary embodiment of the present disclosure.

FIG. 2 illustrates a pixel according to an exemplary embodiment of the present disclosure.

In FIG. 2, pixels PX[i, j] disposed in the i-th row or horizontal line and j-th column or vertical line are shown for better understanding and ease of description, but the same circuit may be applied to other pixels.

Referring to FIG. 2, the pixel PX[i, j] may include a light emitting element EL, first to seventh transistors T1 to T7 and a storage capacitor Cst.

The light emitting element EL may include a first electrode electrically connected to a second electrode, such as a drain electrode, of the first transistor T1, and a second electrode connected to the second power supply VSS. Specifically, the first electrode of the light emitting element EL may be electrically connected to the second electrode of the first transistor T1 through the sixth transistor T6.

The light emitting element EL may generate light having a predetermined luminance corresponding to an amount of current or a driving current supplied from the first transistor T1. In an exemplary embodiment, the light emitting element EL may be an organic light emitting diode including an organic emission layer. In this case, the first electrode of the light emitting element EL may be an anode, and the second electrode of the light emitting element EL may be a cathode. Conversely, the first electrode of the light emitting element EL may be a cathode, and the second electrode may be an anode.

In another exemplary embodiment, the light emitting element EL may be an inorganic light emitting element formed of an inorganic material. Alternatively, the light emitting element EL may have a plurality of inorganic light emitting elements connected in parallel and/or in series between the second power supply VSS and the second electrode of the first transistor T1.

The first transistor T1 may include a first electrode electrically connected to the first power supply VDD, a second electrode electrically connected to the first electrode of the light emitting element EL, and a gate electrode connected to a first node N1. Specifically, the first electrode of the first transistor T1 may be connected to the first power supply VDD through the fifth transistor T5. The second electrode of the first transistor T1 may be connected to the light emitting element EL through the sixth transistor T6. The first transistor T1 may supply a driving current to the light emitting element EL. The first transistor T1 may be referred to as a driving transistor. That is, the first transistor T1 may control the amount of current flowing from the first power supply VDD via the light emitting element EL to the second power supply VSS in response to a voltage applied to the first node N1.

The storage capacitor Cst may be connected between the first power supply VDD and the first node N1. For example, the storage capacitor Cst may include a first electrode connected to the first power supply VDD and a second electrode connected to the first node N1. The storage capacitor Cst may be charged with a difference voltage between the first power supply VDD and the first node N1.

The second transistor T2 may be connected between the data line DL[j] and a third node N3. The second transistor T2 may include a gate electrode connected to an i-th scan line SL[i]. The second transistor T2 may be turned on when the scan signal of low level is supplied to the i-th scan line SL[i] to electrically connect the data line DL[j] and the third node N3. Therefore, the data voltage or data signal supplied to the data line DL[j] may be transferred to the third node N3.

In addition, when the second transistor T2 is turned on in response to the scan signal supplied to the i-th scan line SL[i], the data voltage supplied through the data line DL[j] may be supplied to the pixel PX[i, j]. For example, the storage capacitor Cst may be charged with the difference voltage between the voltage of the first power supply VDD and the data voltage.

The third transistor T3 may be connected between the first node N1 and a second node N2. The third transistor T3 may include a gate electrode connected to the i-th scan line SL[i]. The third transistor T3 may be turned on when the scan signal of low level is supplied to the i-th scan line SL[i] to electrically connect the first node N1 and the second node N2. When the first node N1 and the second node N2 are electrically connected to each other, the first transistor T1 may have a form equivalent to a diode. When the first transistor T1 has the form equivalent to the diode, the threshold voltage of the first transistor T1 may be compensated by a charge accumulated in the first electrode of the first transistor T1.

The fourth transistor T4 may include a gate electrode connected between the first node N1 and the initialization power supply Vint, and connected to the previous scan line, or i−1-th scan line, SL[i−1]. The fourth transistor T4 may be turned on when a previous scan signal is supplied through the previous scan line to initialize the gate electrode of the first transistor T1 and the second electrode of the storage capacitor Cst to the voltage of the initialization power supply Vint.

The fifth transistor T5 may be connected between the first power supply VDD and the third node N3. The fifth transistor T5 may include a gate electrode connected to the i-th light emission control line EL[i]. The fifth transistor T5 may be turned on when the light emission control signal is supplied through the i-th light emission control line EL[i] to electrically connect the first electrode of the first transistor T1 and the first power supply VDD to each other.

The sixth transistor T6 may be connected between the second node N2 and the first electrode of the light emitting element EL. The sixth transistor T6 may include a gate electrode connected to the i-th light emission control line EL[i]. For example, the sixth transistor T6 may be turned on by the light emission control signal supplied through the i-th light emission control line EL[i] to electrically connect the second node N2 and the first electrode of the light emitting element EL.

The seventh transistor T7 may be connected between the first electrode of the light emitting element EL and the initialization power supply Vint. The seventh transistor T7 may include a gate electrode connected to the i-th scan line SL[i]. Therefore, the seventh transistor T7 may be turned on when the scan signal is supplied to the i-th scan line SL[i] to initialize the voltage of the first electrode of the light emitting element EL to the voltage of the initialization power supply Vint.

In an exemplary embodiment, the transistors T1, T2, T3, T4, T5, T6, and T7 shown in FIG. 2 may be p-type transistors such as P-channel metal oxide semiconductor (PMOS). For example, the transistors T1, T2, T3, T4, T5, T6, and T7 shown in FIG. 2 may be Low-Temperature Poly-Silicon (LTPS) thin film transistors. However, embodiments are not limited thereto, and the transistors T1, T2, T3, T4, T5, T6, and T7 may be n-type transistors such as N-channel metal oxide semiconductor (NMOS).

The display device DD according to embodiments of the present disclosure is not limited to pixels shown in FIG. 2, and may be implemented with various types of pixels capable of being applied by a person of ordinary skill in the pertinent art.

Meanwhile, a capacitive coupling Cde may occur between a line to which the first power supply VDD is applied and the data line DL[j] in a pixel PX[i, j] shown in FIG. 2. In addition, a capacitive coupling Cdi may occur between the data line DL[j] and a line to which the initialization power supply Vint is applied. Further, a capacitive coupling Cgi may occur between a line to which the initialization power supply Vint is applied and the gate electrode of the first transistor T1. These capacitive couplings Cde, Cdi, and Cgi, which may also be referred to as parasitic capacitors or capacitances, may allow initialization to take place at a voltage different from the voltage of the initialization power supply Vint when the initialization by the initialization power supply Vint is performed, and/or affect the voltage stored in the storage capacitor Cst. In addition, the capacitive couplings Cde, Cdi, and Cgi may allow an impulse noise to be included when the first power supply VDD is supplied, and cause a reaction speed at which the voltage of the initialization power supply Vint is supplied to be slowed down. In particular, the capacitive couplings may generate a horizontal crosstalk component where an afterimage occurs between adjacent horizontal lines. The horizontal crosstalk may also be referred to as a line crosstalk.

Figure 3:
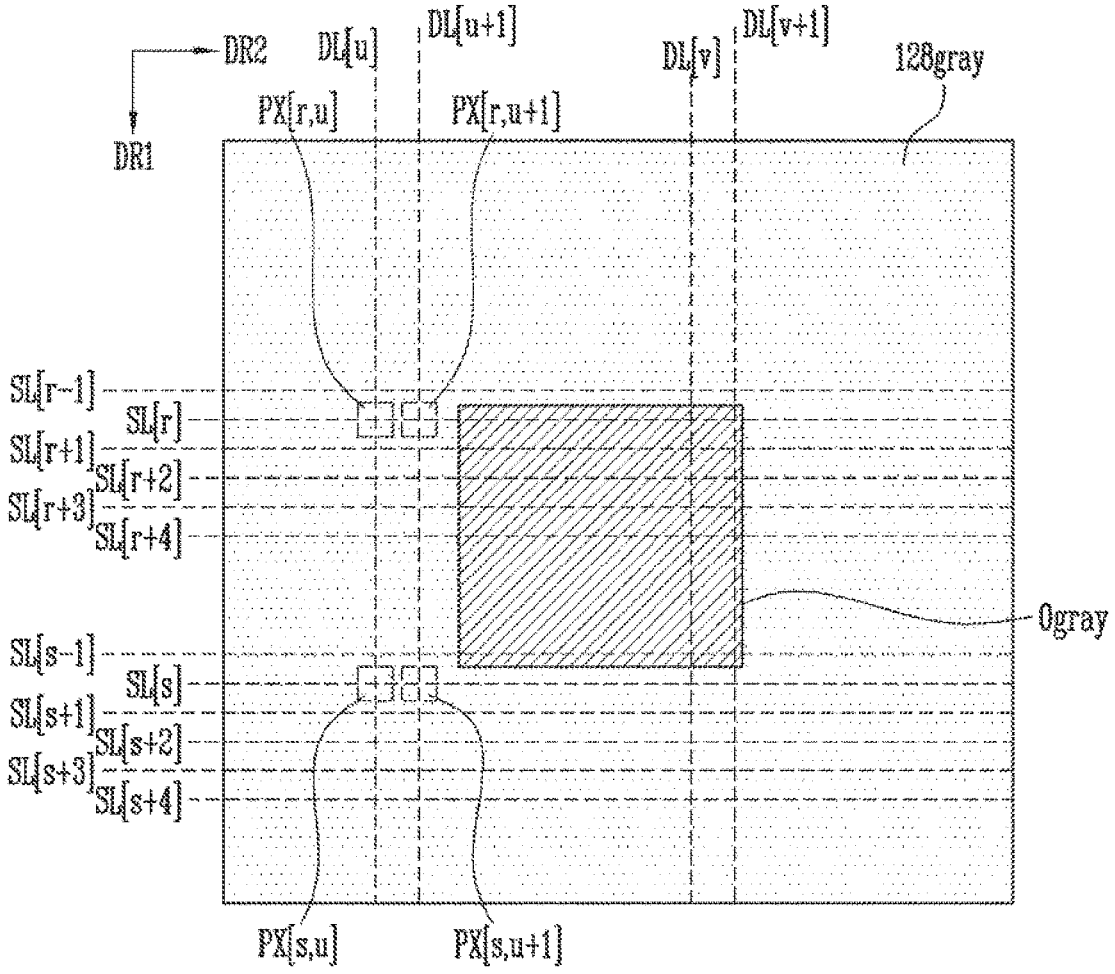
FIG. 3 is a schematic block diagram illustrating a horizontal crosstalk component to be removed by a display device according to an exemplary embodiment of the present disclosure.

FIG. 3 illustrates horizontal crosstalk to be removed by a display device according to an exemplary embodiment of the present disclosure.

Referring to FIG. 3, scan lines SL[1], . . . , SL[r−1], SL[r], SL[r+1], SL[r+2], SL[r+3], SL[r+4], . . . , SL[s−1], SL[s], SL[s+1] SL[s+2] SL[s+3], SL[s+4], . . . , SL[p] may be alternately disposed in the first direction DR1 along one side of the display panel 100, and each scan line may be connected to each horizontal line, respectively, in which pixels are disposed.

Data lines DL[1], . . . , DL[u], DL[u+1], . . . , DL[v], DL[v+1], . . . , DL[q] may be alternately disposed in the second direction DR2 along another side of the display panel 100, and each data line may be connected to each vertical line, respectively, in which pixels are disposed.

Pixels connected from the first scan line SL[1] to the r−1-th scan line SL[r−1], where r is a natural number greater than 0 and less than p, may receive data voltages corresponding to a grayscale value of 128. For the next scan period, some of pixels connected from the r-th scan line SL[r] to the r+4-th scan line SL[r+4] and pixels connected to the s−1-th scan line SL[s−1] may receive data voltages corresponding to a grayscale value of 128, and the rest may receive data voltages corresponding to a grayscale value of zero. In addition, pixels connected to the s-th scan line SL[s] through the last scan line SL[p] may receive data voltages corresponding to a grayscale value of 128.

In a preferred case, a pixel PX[r, u] connected to the r-th scan line SL[r] and connected to the u-th data line DL[u], where u is a natural number greater than 0 and less than q, and a pixel PX[r, u+1] connected to the r-th scan line SL[r] and connected to the u+1-th data line DL[u+1] may emit light at a grayscale value of 128.

However, due to the capacitive couplings described in FIG. 2, the pixel PX[r, u] connected to the r-th scan line SL[r] and connected to the u-th data line DL[u], where u is a natural number greater than 0 and less than q, and the pixel PX[r, u+1] connected to the r-th scan line SL[r] and connected to the u+1-th data line DL[u+1] may emit light at a grayscale value higher than a grayscale value of 128. Therefore, a bright line may appear in which pixels connected to the r-th scan line SL[r] are brighter than pixels connected to the r−1-th scan line SL[r−1].

In a preferred case, a pixel PX[s, u] connected to the s-th scan line SL[s] and connected to the u-th data line DL[u], and a pixel PX[s, u+1] connected to the s-th scan line SL[s] and connected to the u+1-th data line DL[u+1] may emit light at a grayscale value of 128.

However, due to the capacitive couplings described in FIG. 2, the pixel PX[s, u] connected to the s-th scan line SL[s] and connected to the u-th data line DL[u], and the pixel PX[s, u+1] connected to the s-th scan line SL[s] and connected to the u+1-th data line DL[u+1] may emit light at a grayscale value lower than a grayscale value of 128. Therefore, a dark line may appear in which pixels connected to the s-th scan line SL[s] are darker than pixels connected to the s−1-th scan line SL[s−1].

The bright line or dark line do not necessarily occur only between each horizontal line in which the data voltage changes rapidly. For example, since the response speed of the voltage according to the initialization power supply shown in FIG. 2 may be decreased for a plurality of horizontal periods, the bright lines or dark lines may appear hierarchically in a plurality of horizontal lines.

For example, even though pixels connected to the r+1-th scan line SL[r+1] are darker than pixels connected to the r-th scan line SL[r], the bright line that still emits light at a grayscale value higher than a grayscale value of 128 may appear. Even though pixels connected to the r+2-th scan line SL[r+2] are darker than pixels connected to the r+1-th scan line SL[r+1], the bright line that still emits light at a grayscale value higher than a grayscale value of 128 may appear.

Similarly, even though pixels connected to the s+1-th scan line SL[s+1] are brighter than pixels connected to the s-th scan line SL[s], the dark line that still emits light at a grayscale value lower than a grayscale value of 128 may appear. Even though pixels connected to the s+2-th scan line SL[s+2] are brighter than pixels connected to the s+1-th scan line SL[s+1], the dark line that still emits light at a grayscale value lower than a grayscale value of 128 may appear.

As described above, since the horizontal crosstalk in which the bright line or dark line appear may appear over a plurality of horizontal lines, it is necessary to compensate for data voltages input to one horizontal line based on data voltages input to a plurality of horizontal lines.

Hereinafter, with respect to pixels disposed on the i-th horizontal line, where i is a natural number of three or more, such as with respect to pixels disposed on at least three horizontal lines, the configuration and operation of the crosstalk compensator 510 for improving the horizontal crosstalk may be described in greater detail.

Figure 4:
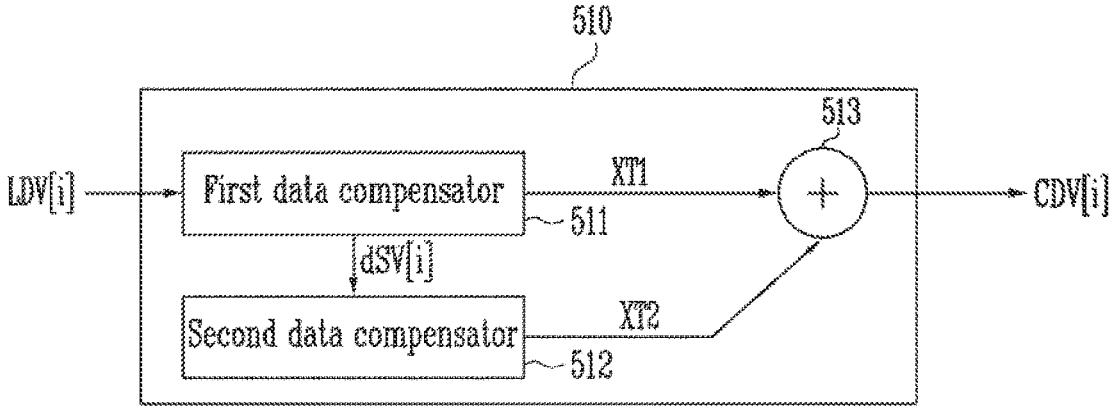
FIG. 4 is a schematic block diagram illustrating a configuration of a crosstalk compensator shown in FIG. 1.

FIG. 4 illustrates a configuration of a crosstalk compensator shown in FIG. 1.

Referring to FIG. 4, the crosstalk compensator 510 may include a first data compensator 511, a second data compensator 512, and a first adder 513.

The first data compensator 511 may sequentially receive first data voltages supplied to pixels disposed on one horizontal line from the data driver 500. For example, the first data compensator 511 may sequentially receive the first data voltages DV[1], DV[2], . . . , DV[q], or LDV[i] corresponding to pixels disposed on the i-th horizontal line. In addition, the first data compensator 511 may output the first compensation voltage XT1 by comparing the first data voltages LDV[i] corresponding to pixels disposed on the i-th horizontal line, where i is a natural number of three or more, with the first data voltages LDV[i−1] corresponding to the pixels disposed on the i−1-th horizontal line.

Figure 5:
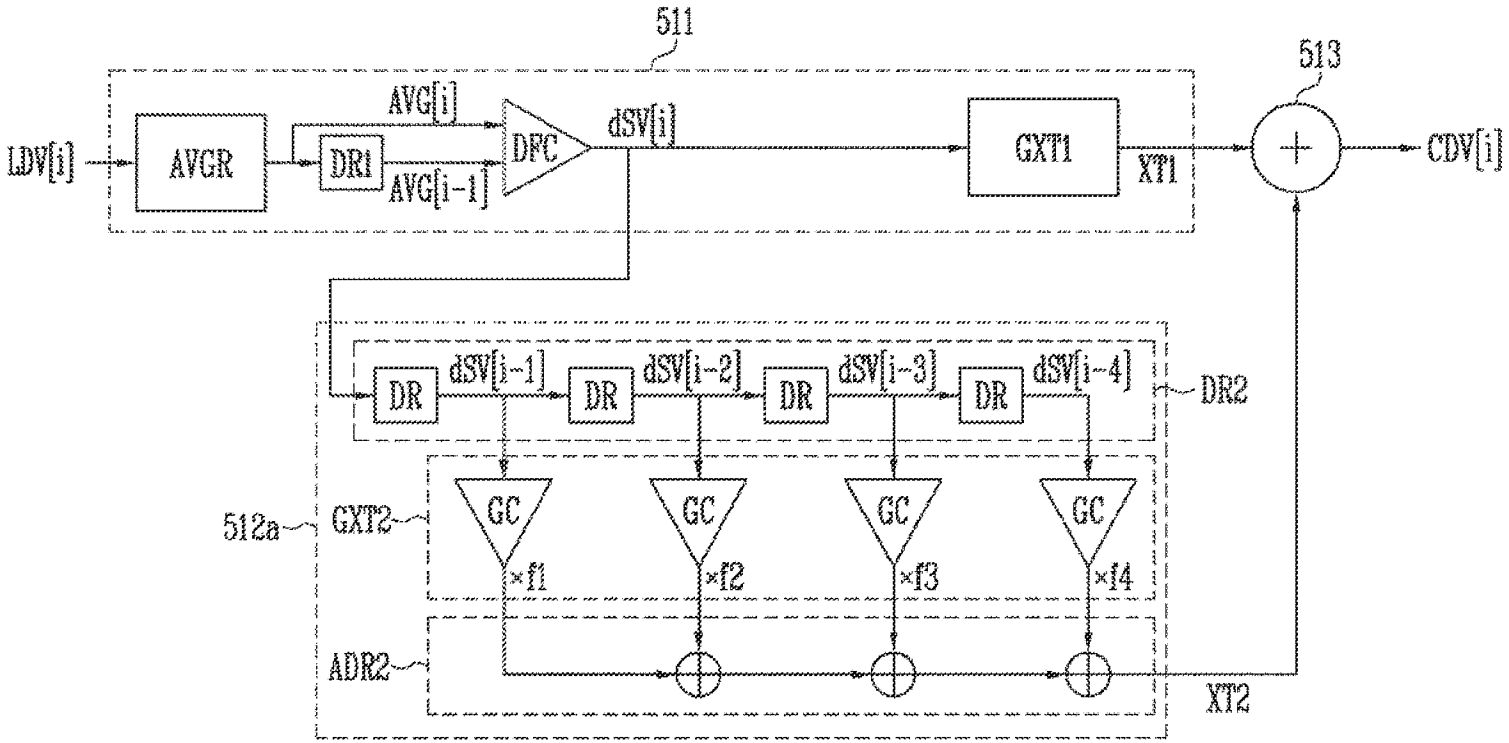
FIG. 5 is a schematic block diagram illustrating a first exemplary embodiment of a crosstalk compensator according to an exemplary embodiment of the present disclosure.
Figure 6:
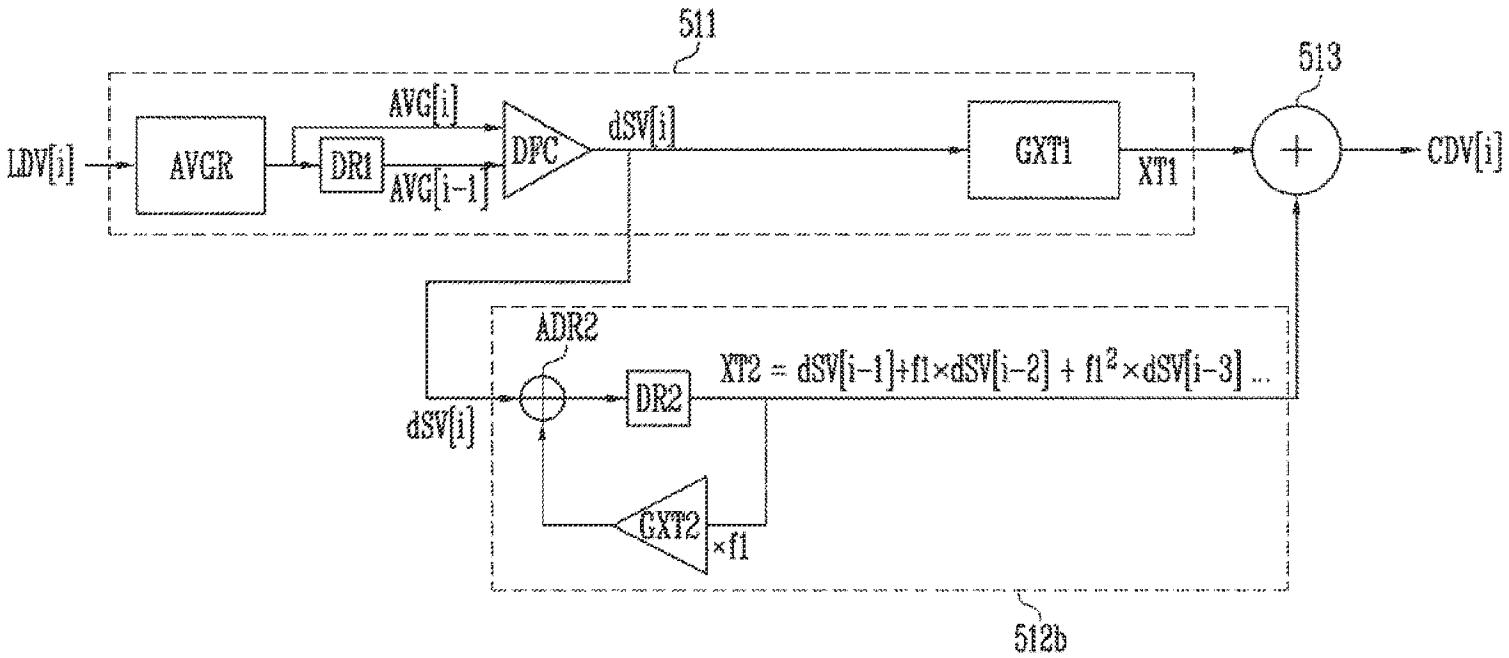
FIG. 6 is a schematic block diagram illustrating a second exemplary embodiment of a crosstalk compensator according to an exemplary embodiment of the present disclosure.

The second data compensator 512 may output the second compensation voltage XT2 by comparing the first data voltages LDV[i−2], LDV[i−3], . . . , LDV[i-k] corresponding to pixels disposed on the i−2-th to i-k-th horizontal lines, where k is a natural number greater than one and less than i, in units of adjacent horizontal lines To this end, the second data compensator 512 may receive the first difference voltage dSV[i] of FIGS. 5 to 6 from the first data compensator 511, but is not limited thereto. Similar to the first data compensator 511, for example, the second data compensator 512 may sequentially directly receive the first data voltages DV[1], DV[2], . . . , DV[q], or LDV[i] to be supplied to the pixels disposed on the i-th horizontal line from the data driver 500, and output the second compensation voltage XT2.

The first adder 513 may calculate the compensation voltage CDV[i] by linearly combining the first compensation voltage XT1 and the second compensation voltage XT2. For example, the first adder 513 may calculate the compensation voltage CDV[i] by adding the first compensation voltage XT1 and the second compensation voltage XT2. Here, the calculated compensation voltage LDV[i] may be added to each of the first data voltages LDV[i] corresponding to pixels disposed on the i-th horizontal line by the data driver 500.

FIG. 5 illustrates a crosstalk compensator according to an exemplary embodiment of the present disclosure.

Referring to FIG. 5, the first data compensator 511 may include an average voltage calculator AVGR, a first delay unit DR1, a difference calculator DFC, and a first compensation gain application unit GXT1.

The average voltage calculator AVGR may output a first average value AVG[i] of the first data voltages LDV[i] corresponding to pixels disposed on the i-th horizontal line. For example, the average voltage calculator AVGR may add the first data voltages LDV[i] corresponding to the pixels disposed on the i-th horizontal line, and calculate the first average value of the added first data voltages.

The first delay unit DR1 may output a second average value AVG[i−1] of the first data voltages corresponding to the pixels disposed on the i−1-th horizontal line by delaying an output of the average voltage calculator AVGR by a predetermined time. Here, the predetermined time may be one horizontal period. That is, since the first delay unit DR1 delays the output of the average voltage calculator AVGR by one horizontal period (1 H) and outputs the delayed output, when the average voltage calculator AVGR outputs the first average value AVG[i] of the first data voltages LDV[i] that corresponds to the pixels disposed on the i-th horizontal line, the first delay unit DR1 outputs the second average value AVG[i−1] of the first data voltages LDV[i−1] corresponding to the pixels disposed on the i−1-th horizontal line. The first delay unit DR1 may be implemented as a delay register.

The difference calculator DFC may output a first difference voltage dSV[i] by subtracting the first average value AVG[i] and the second average value AVG[i−1] from each other. Here, the first difference voltage may correspond to an average data voltage difference between pixels disposed on the i-th horizontal line and pixels disposed on the i−1-th horizontal line.

The first compensation gain application unit GXT1 may output the first compensation voltage XT1, to a first input of a first adder 513, by applying the first compensation gain to the first difference voltage dSV[i]. For example, the first compensation gain application unit GXT1 may be implemented as an amplification circuit having various types of gain.

The first compensation gain may be predetermined to cancel the horizontal crosstalk between pixels disposed on the i-th horizontal line and pixels disposed on the i−1-th horizontal line. For example, as shown in FIG. 3, input image data in which the data voltage supplied to pixels rapidly changes with respect to a specific horizontal line is input to the display device DD. The first compensation gain may be determined experimentally in which the bright line or dark line appearing in pixels disposed on adjacent i-th horizontal lines and i−1-th horizontal lines is removed.

The second data compensator 512a may include a second delay unit DR2, a second compensation gain application unit GXT2, and a second adder ADR2.

The second delay unit DR2 may output at least one difference voltage corresponding to the pixels disposed on the i−1-th to i-k-th horizontal lines, where k is a natural number greater than one and less than i, by delaying an output of the difference calculator DFC by a predetermined time. For example, the second delay unit DR2 may output the second difference voltage dSV[i−1] by delaying the output of the difference calculator DFC by one horizontal period, output the third difference voltage dSV[i−2] by delaying the output of the difference calculator DFC by two horizontal periods, output the fourth difference voltage dSV[i−3] by delaying the output of the difference calculator DFC by three horizontal periods, and output the fifth difference voltage dSV[i−4] by delaying the output of the difference calculator DFC by four horizontal periods.

The second difference voltage dSV[i−1] may be a difference voltage between an average value of the first data voltages corresponding to the pixels disposed on the i−1-th horizontal line and an average value of the first data voltages corresponding to the pixels disposed on the i−2-th horizontal line. The third difference voltage dSV[i−2] may be a difference voltage between an average value of the first data voltages corresponding to the pixels disposed on the i−2-th horizontal line and an average value of the first data voltages corresponding to the pixels disposed on the i−3-th horizontal line. The fourth difference voltage dSV[i−3] may be a difference voltage between an average value of the first data voltages corresponding to the pixels disposed on i−3-th horizontal line and an average value of the first data voltages corresponding to the pixels disposed on i−4-th horizontal line. The fifth difference voltage dSV[i−4] may be a difference voltage between an average value of the first data voltages corresponding to the pixels disposed on the i−4-th horizontal line and an average value of the first data voltages corresponding to the pixels disposed on the i−5-th horizontal line.

In FIG. 5, the second difference voltage dSV[i−1] to the fifth difference voltage dSV[i−4] are shown to be output by serially connecting four delay registers DR, but the embodiment is exemplary, and the number of delay registers DR and the number of difference voltages output through the second delay unit DR2 may be variously modified.

The second compensation gain application unit GXT2 may apply independent second compensation gains f1, f2, f3, and f4 to at least one difference voltage output from the second delay unit DR2. For example, the second compensation gain f1 may be applied to the second difference voltage dSV[i−1], the second compensation gain f2 may be applied to the third difference voltage, the second compensation gain f3 may be applied to the fourth difference voltage, and the second compensation gain f4 may be applied to the fifth difference voltage, where f1, f2, f3, and f4 are arbitrary constants. The second compensation gain application unit GTX2 may be implemented as a plurality of amplification circuits GC, receiving the outputs of the delay registers DR included in the second delay unit DR2.

The second compensation gains f1, f2, f3, and f4 may be predetermined to cancel the horizontal crosstalk between the pixels disposed on two or more i-k-th horizontal lines, where k is a natural number greater than two. For example, the second compensation gain f1 may be experimentally determined such that the horizontal crosstalk between the pixels disposed on the i−1-th horizontal line and the pixels disposed on the i−2-th horizontal line may be canceled. The second compensation gain f2 may be experimentally determined such that the horizontal crosstalk between the pixels disposed on the i−2-th horizontal line and the pixels disposed on the i−3-th horizontal line may be canceled. The second compensation gain f3 may be experimentally determined such that the horizontal crosstalk between the pixels disposed on the i−3-th horizontal line and the pixels disposed on the i−4-th horizontal line may be canceled. The second compensation gain f4 may be experimentally determined such that the horizontal crosstalk between the pixels disposed on the i−4-th horizontal line and the pixels disposed on the i−5-th horizontal line may be canceled.

The second adder ADR2 may output the second compensation voltage XT2, to a second input of the first adder 513, by adding the output values of the second compensation gain application unit GXT2. The first adder 513 may output the compensation voltage CDV[i] by adding the first compensation voltage XT1 and the second compensation voltage XT2.

FIG. illustrates a crosstalk compensator according to an exemplary embodiment of the present disclosure.

Since FIG. 6 shows an exemplary embodiment modifying the second data compensator 512a shown in FIG. 5, the second data compensator 512b, which differs from 512a of FIG. 5, will be described, while duplicate description may be omitted.

As shown in FIG. 5, since independent amplification circuits GC are used when implementing the second data compensator 512a, a circuit area may be increased.

Since the horizontal crosstalk tends to gradually decrease at a constant ratio between adjacent horizontal lines, the second data compensator 512b may be implemented as a type of loop filter.

For example, the second data compensator 512b may include a second adder ADR2 that adds the first difference voltage dSV[i] and an output of a second compensation gain application unit GXT2 to each other and outputs an added value, a second delay unit DR2 that outputs the second compensation voltage XT2 by delaying an output of the second adder ADR2 by a predetermined time, and the second compensation gain application unit GXT2 that outputs feedback to the second adder ADR2 by applying second compensation gain to the output of the second delay unit DR2.

When the second data compensator 512b has a loop filter type, the compensation gain need not be applied to the second difference voltage dSV[i−1] at the second compensation voltage XT2=dSV[i−1]+f1·dSV[i−2]+f12·dSV[i−3]+ . . . of FIG. 6. The second data compensator 512b may further include a third compensation gain application unit that applies a third compensation gain to the second compensation voltage XT2 before addition by the first adder 513.

As shown in FIG. 6, when the second data compensator 512b is implemented as a loop filter type, the compensation gain application unit GXT2 and the second delay unit DR2 may be implemented as a single amplification circuit and a delay register, respectively, so a circuit area may be reduced.

FIG. illustrates a driving method of a display device according to an exemplary embodiment of the present disclosure.

Figure 7:
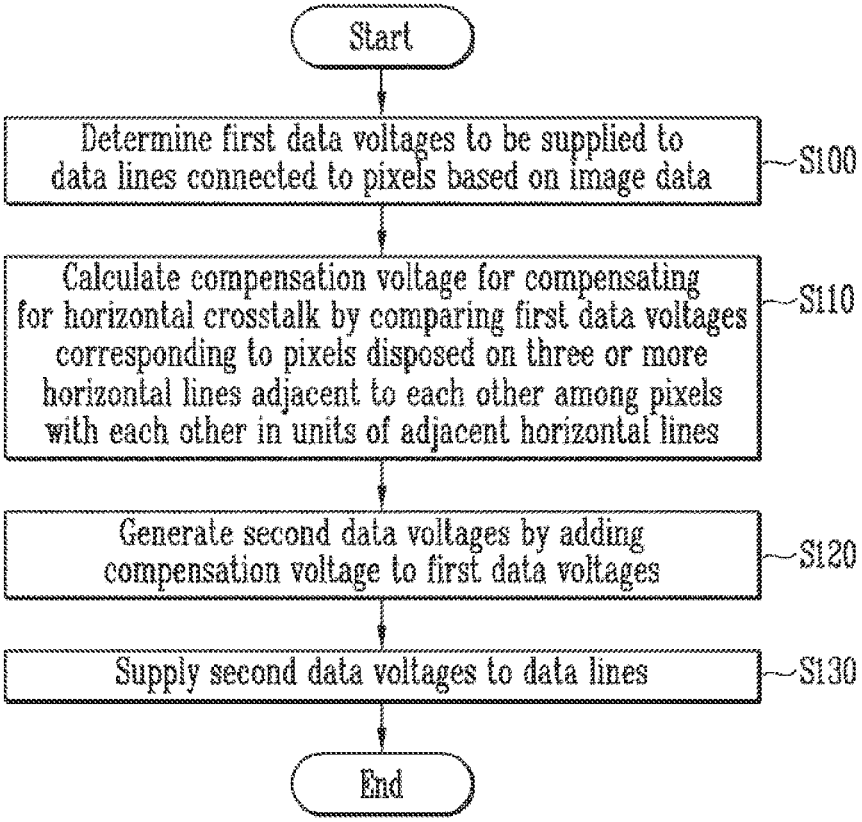
FIG. 7 is a flowchart diagram illustrating a driving method of a display device according to an exemplary embodiment of the present disclosure.

Referring to FIG. 7, the driving method of the display device may include determining first data voltages to be supplied to data lines connected to pixels based on image data at function block S100, calculating a compensation voltage for compensating for a horizontal crosstalk component by comparing the first data voltages corresponding to pixels disposed on three or more horizontal lines adjacent to each other among the pixels with each other in units of adjacent horizontal lines at function block S110, generating second data voltages by adding the compensation voltages to the first data voltages at function block S120, and supplying the second data voltages to the data lines at function block S130.

The calculating of the compensation voltage at function block S110 may include calculating a first compensation voltage by comparing the first data voltages corresponding to pixels disposed on an i-th horizontal line, where i is a natural number of three or more, with the first data voltages corresponding to pixels disposed on an i−1-th horizontal line, and calculating a second compensation voltage by comparing the first data voltages corresponding to pixels disposed on the i−1-th to i-k-th horizontal lines, where k is a natural number greater than one and less than i, in units of adjacent horizontal lines.

The calculating of the compensation voltage at function block S110 may further include calculating the compensation voltage by linearly combining the first compensation voltage and the second compensation voltage.

The calculating of the first compensation voltage may include calculating a first difference voltage by differentiating from each other a first average value of the first data voltages corresponding to the pixels disposed on the i-th horizontal line and a second average value of the first data voltages corresponding to the pixels disposed on the i−1-th horizontal line, and calculating the first compensation voltage by applying a first compensation gain to the first difference voltage.

The first compensation gain may be predetermined to cancel a horizontal crosstalk component between the pixels disposed on the i-th horizontal line and the pixels disposed on the i−1-th horizontal line.

The calculating of the second compensation voltage may include calculating average values in units of horizontal lines for the first data voltages corresponding to pixels disposed on the i−1-th to i-k-th horizontal lines, calculating at least one difference voltage by differentiating from each other average values corresponding to adjacent horizontal lines among the average values, applying a second compensation gain to the at least one difference voltage, and calculating the second compensation voltage by adding the at least one difference voltage to which the second compensation gain is applied.

The second compensation gain may be independently applied to the at least one difference voltage at a constant attenuation ratio.

In the generating of the second data voltages at function block S120, the second data voltage may be generated by adding the compensation voltage to each of the first data voltages corresponding to the pixels disposed on the i-th horizontal line.

The driving method of the display device may be performed by the display device DD described in FIG. 6, for example. Therefore, it shall be understood that the driving method of the display devices DD described in FIGS. 1 to 6 may be also applied with other function blocks, subcircuits, subroutines or steps in addition to the function blocks described above.

The drawings and detailed description of the present disclosure referred to above are offered in a descriptive sense, only, and are used for the purposes of illustration by way of example, only, and are not intended to limit the meaning thereof or to limit the scope of the disclosure as set forth in the appended claims. Accordingly, a person having ordinary skill in the pertinent art will understand from the above that various modifications and other equivalent embodiments are also possible. Therefore, the real protective scope of the present disclosure shall be determined only by the technical scope and spirit of the accompanying claims.

What is claimed is:

1. A [display] *driver* device comprising:

[a display panel including a plurality of pixels connected to data lines;]

a data driver connected to [the] data lines and configured to determine first data voltages corresponding to [the] pixels, to generate second data voltages by [adding] *applying* compensation voltage to the first data voltages, and to supply the second data voltages to the pixels through the data lines; and a crosstalk compensator connected to the data driver and configured to calculate the compensation voltage by comparing the first data voltages corresponding to pixels disposed in at least three adjacent horizontal lines, wherein the crosstalk compensator outputs at least one compensation voltage by comparing the first data voltages corresponding to pixels disposed in one horizontal line with the first data voltages corresponding to pixels disposed in an adjacent horizontal line, respectively,

*wherein the crosstalk compensator includes: a first data compensator configured to output a first compensation voltage by comparing the first data voltages corresponding to pixels disposed in a horizontal line with the first data voltages corresponding to pixels disposed in an adjacent horizontal line, and a second data compensator configured to output a second compensation voltage by comparing the first data voltages corresponding to pixels disposed in the adjacent horizontal line to the first data voltages corresponding to pixels disposed in at least one next adjacent horizontal line,*

*wherein the second data compensator includes: a second adder configured to add a first difference voltage and an output of a second compensation gain application unit to each other and to output an added value, and a second delay unit configured to output the second compensation voltage by delaying an output of the second adder by a predetermined time,*

*wherein the second compensation gain application unit is configured to output feedback to the second adder by applying a second compensation gain to the output of the second delay unit.*

2. A [display] *driver* device comprising:

[a display panel including a plurality of pixels connected to data lines;]

a data driver connected to [the] data lines and configured to determine first data voltages corresponding to [the] pixels, to generate second data voltages by [adding] *applying* compensation voltage to the first data voltages, and to supply the second data voltages to the pixels through the data lines; and a crosstalk compensator connected to the data driver and configured to calculate the compensation voltage by comparing the first data voltages corresponding to pixels disposed in at least three adjacent horizontal lines, wherein the crosstalk compensator includes:

a first data compensator configured to output a first compensation voltage by comparing the first data voltages corresponding to pixels disposed in a horizontal line with the first data voltages corresponding to pixels disposed in an adjacent horizontal line; and a second data compensator configured to output a second compensation voltage by comparing the first data voltages corresponding to pixels disposed in the adjacent horizontal line to the first data voltages corresponding to pixels disposed in at least one next adjacent horizontal line,

*wherein the first data compensator includes: an average voltage calculator configured to output a first average value of the first data voltages corresponding to the pixels disposed in the horizontal line; a first delay unit configured to output a second average value of the first data voltages corresponding to the pixels disposed in the adjacent horizontal line by delaying an output of the average voltage calculator by a predetermined time; and a difference calculator configured to output a first difference voltage by differentiating from each other the first average value and the second average value,*

*wherein the second data compensator includes: a second delay unit configured to output at least one difference voltage corresponding to the pixels disposed in the adjacent horizontal line to the at least one next adjacent horizontal line by delaying an output of the difference calculator by a predetermined time.*

3. The [display] *driver* device of claim 2, wherein the crosstalk compensator further includes a first adder configured to calculate the compensation voltage by linearly combining the first compensation voltage and the second compensation voltage.

4. The [display] *driver* device of claim 2, wherein the first data compensator *further* includes:

[an average voltage calculator configured to output a first average value of the first data voltages corresponding to the pixels disposed in the horizontal line;

a first delay unit configured to output a second average value of the first data voltages corresponding to the pixels disposed in the adjacent horizontal line by delaying an output of the average voltage calculator by a predetermined time;

a difference calculator configured to output a first difference voltage by differentiating from each other the first average value and the second average value; and]

a first compensation gain application unit configured to output the first compensation voltage by applying a first compensation gain to the first difference voltage.

5. The [display] *driver* device of claim 4, wherein the first compensation gain is predetermined to cancel a horizontal crosstalk component between the pixels disposed in the horizontal line and the pixels disposed in the adjacent horizontal line.

6. The [display] *driver* device of claim 4, wherein the predetermined time is 1 horizontal period.

7. The [display] *driver* device of claim 4, wherein the second data compensator *further* includes:

[a second delay unit configured to output at least one difference voltage corresponding to the pixels disposed in the adjacent horizontal line to the at least one next adjacent horizontal line by delaying an output of the difference calculator by a predetermined time;]

a second compensation gain application unit configured to apply an independent second compensation gain to the at least one difference voltage; and a second adder configured to output the second compensation voltage by adding output values of the second compensation gain application unit.

8. The [display] *driver* device of claim 7, wherein the second compensation gain is predetermined to cancel a horizontal crosstalk component between the pixels disposed in the adjacent horizontal line to the at least one next adjacent horizontal line.

9. The [display] *driver* device of claim 7, wherein the at least one difference voltage includes:

a second difference voltage between an average value of the first data voltages corresponding to the pixels disposed in the adjacent horizontal line and an average value of the first data voltages corresponding to the pixels disposed in the next adjacent horizontal line; and a third difference voltage between the average value of the first data voltages corresponding to the pixels disposed in the next adjacent horizontal line and an average value of the first data voltages corresponding to pixels disposed in a next farther adjacent horizontal line.

10. The [display] *driver* device of claim 4, wherein the second data compensator includes:

a second adder configured to add the first difference voltage and an output of a second compensation gain application unit to each other and to output an added value;

a second delay unit configured to output the second compensation voltage by delaying an output of the second adder by a predetermined time; and a second compensation gain application unit configured to output feedback to the second adder by applying a second compensation gain to the output of the second delay unit.

11. The [display] *driver* device of claim 2, further comprising a memory that stores the first data voltages in units of one horizontal line.

12. The [display] *driver* device of claim 11, wherein the data driver is configured to read the first data voltages corresponding to the pixels disposed in the horizontal line from the memory, and to generate the second data voltages by adding the compensation voltage to each of the read first data voltages.

13. A driving method of a [display] *driver* device comprising:

determining first data voltages corresponding to data lines connected to pixels based on image data;

calculating a compensation voltage for *a horizontal line for* compensating for a horizontal crosstalk component by comparing the first data voltages corresponding to pixels disposed in at least three adjacent horizontal lines;

generating second data voltages *corresponding to pixels disposed in the horizontal line* by [adding] *applying* the compensation voltage to the first data voltages *corresponding to the pixels disposed in the horizontal line*; and supplying the second data voltages to the data lines, wherein calculating the compensation voltage includes calculating at least one compensation voltage by comparing the first data voltages corresponding to pixels disposed in one horizontal line with the first data voltages corresponding to pixels disposed in an adjacent horizontal line, respectively,

*wherein calculating the at least one compensation voltage includes calculating a first compensation voltage by comparing the first data voltages corresponding to the pixels disposed in the horizontal line with the first data voltages corresponding to pixels disposed in an adjacent horizontal line, and calculating a second compensation voltage by comparing the first data voltages corresponding to pixels disposed in the adjacent horizontal line to at least one next adjacent horizontal line in units of one horizontal line,*

*wherein calculating the second compensation voltage includes calculating average values in units of one horizontal line for the first data voltages corresponding to pixels disposed in the adjacent horizontal line to the at least one next adjacent horizontal line, calculating at least one difference voltage by differentiating from each other average values corresponding to adjacent horizontal lines among the average values, and applying a second compensation gain to the at least one difference voltage.*

14. The [driving method of claim 13] *driver device of claim 1*, [wherein calculating the compensation voltage includes:

calculating a first compensation voltage by comparing the first data voltages corresponding to pixels disposed in a horizontal line with the first data voltages corresponding to pixels disposed in an adjacent horizontal line; and calculating a second compensation voltage by comparing] *further comprising a memory that stores* the first data voltages [corresponding to pixels disposed in the adjacent horizontal line to at least one next adjacent horizontal line] in units of one horizontal line.

15. The driving method of claim [14] *13*, wherein calculating the compensation voltage further includes calculating the compensation voltage by linearly combining the first compensation voltage and the second compensation voltage.

16. The driving method of claim [14] *13*, wherein calculating the first compensation voltage includes:

calculating a first difference voltage by differentiating from each other a first average value of the first data voltages corresponding to the pixels disposed in the horizontal line and a second average value of the first data voltages corresponding to the pixels disposed in the adjacent horizontal line; and calculating the first compensation voltage by applying a first compensation gain to the first difference voltage.

17. The driving method of claim 16, wherein the first compensation gain is predetermined to cancel a horizontal crosstalk component between the pixels disposed in the horizontal line and the pixels disposed in the adjacent horizontal line.

18. The driving method of claim [14] *13*, wherein calculating the second compensation voltage *further* includes:

[calculating average values in units of one horizontal line for the first data voltages corresponding to pixels disposed in the adjacent horizontal line to the at least one next adjacent horizontal line;

calculating at least one difference voltage by differentiating from each other average values corresponding to adjacent horizontal lines among the average values;

applying a second compensation gain to the at least one difference voltage; and]

calculating the second compensation voltage by adding the at least one difference voltage to which the second compensation gain is applied.

19. The driving method of claim 18, wherein the second compensation gain is independently applied to the at least one difference voltage at a constant attenuation ratio.

20. The driving method of claim [14] *13*, wherein, in generating the second data voltages, the second data voltage is generated by adding the compensation voltage to each of the first data voltages corresponding to the pixels disposed in the horizontal line.

*21. The driver device of claim 1, further comprising a timing controller configured to generate image data to be displayed in the pixels based on input image data.*

*22. The driver device of claim 21, further comprising a memory that stores the first data voltages in units of one horizontal line.*

*23. The driver device of claim 22, wherein the data driver, the crosstalk compensator, the timing controller, and the memory are integrated on one chip.*

*24. The driver device of claim 1, wherein the first data compensator includes: an average voltage calculator configured to output a first average value of the first data voltages corresponding to the pixels disposed in the horizontal line; a first delay unit configured to output a second average value of the first data voltages corresponding to the pixels disposed in the adjacent horizontal line by delaying an output of the average voltage calculator by a predetermined time; and a difference calculator configured to output the first difference voltage by differentiating from each other the first average value and the second average value.*

*25. The driver device of claim 11, further comprising a timing controller configured to generate image data to be displayed in the pixels based on input image data,*

*wherein the data driver, the crosstalk compensator, the timing controller, and the memory are integrated on one chip.*

*26. The driver device of claim 2, further comprising a timing controller configured to generate image data to be displayed in the pixels based on input image data.*

*27. The driver device of claim 2, wherein the second data voltages are generated by adding a compensation voltage to the first data voltages.*

*28. The driving method of claim 13, wherein the second data voltages are generated by adding a compensation voltage to the first data voltages.*

* * * * *